UNITED STATES PATENT OFFICE.

RUBEN BLANK, OF FRANKFORT-ON-THE-MAIN, GERMANY, ASSIGNOR TO LEOPOLD CASSELLA & CO., OF SAME PLACE.

PROCESS OF OBTAINING INDOXYLIC COMPOUNDS OF AMIDO MALONIC ESTERS.

SPECIFICATION forming part of Letters Patent No. 620,563, dated March 7, 1899.

Original application filed September 22, 1896, Serial No. 606,617. Divided and this application filed February 23, 1898. Serial No. 671,384. (No specimens.)

*To all whom it may concern:*

Be it known that I, RUBEN BLANK, a subject of the Emperor of Russia, residing at Frankfort-on-the-Main, in the Empire of Germany, have invented a certain new and useful Improvement in the Processes of Manufacturing Dyestuffs of the Indigo Series; and I do hereby declare the following to be a full, clear, and exact description of the invention, such as will enable others skilled in the art to which it appertains to make and use the same.

This application is a divison of my application for patent for process of manufacture of dyestuffs of the indigo series, filed September 22, 1896, and serially numbered 606,617, and of which the invention herein described and claimed formed a part. In that application I have described a process of producing aromatic amidomalonic acid esters by allowing the aromatic amines to react upon the halogen malonic acid esters. The present application relates to the process of converting such aromatic amidomalonic acid esters into the corresponding new indoxylic compounds.

The esters which are used in the process of this application are derived from one typical compound, the anilido-malonic-acid-ester of the formula

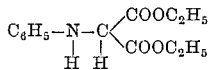

The phenyl ($C_6H_5$) of the foregoing formula may be substituted by homologues or similar radicals, such as tolyl, ($C_7H_7$,) but the rest of the formula remains the same in all cases.

As a description of this process the following examples are given:

1. *Indoxyl condensation of the anilidomalonic acid ester.*—The said ester is placed in a retort, which is then dipped into a paraffin-bath heated before to a temperature of 260° to 265° centigrade. The ester melts with violent elimination of alcohol. After about three minutes the elimination of alcohol decreases, the molten mass at the same time becoming thicker and assuming a dark color. After about five minutes the retort is removed from the paraffin-bath and the molten mass boiled in twice its weight of alcohol and allowed to stand for about one-half hour, whereby a small quantity of a yellow crystalline substance separates. This crystalline substance is filtered off and the indoxylic acid ester precipitated from the clear filtrate by the addition of water. The indoxylic acid ester may be purified by recrystallization from diluted alcohol. I believe the reaction involved is as follows:

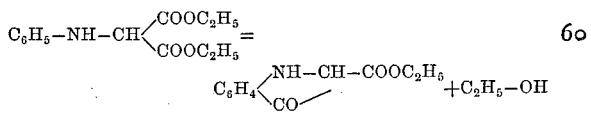

2. *Indoxyl condensation of the paratoluido-malonic acid ester.*—This body is produced in a manner similar to that described above for the production of the indoxylic condensation of anilidomalonic acid ester, but it has been found preferable to produce the condensation at a somewhat lower temperature— namely, from 250° to 255° centigrade. The paratolylindoxylic acid ester thus formed is a new chemical compound and is now produced for the first time. It crystallizes in colorless crystals, melting at a temperature of 155° to 156° centigrade. It is soluble in alcohol and in benzole. It dissolves in alkaline solution, from which it may be precipitated by carbonic acid. Continued boiling with solutions of alkalis or alkaline earths produces the salts of the paratolylindoxylic acid. By heating the said ester with concentrated sulfuric acid in a water-bath the sulfonic acids of the paratolylindigo are formed. I believe the reaction involved is as follows:

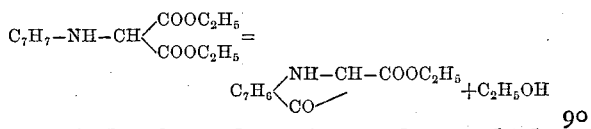

3. *Indoxyl condensation of betanaphtyl-amidomalonic acid ester.*—This ester is converted into its indoxyl compound more readily than the anilido or paratolyl malonic acid esters above mentioned. The reaction takes place at a temperature of 200° centigrade; but it is preferable to effect the reaction at a temperature of 235° to 240° centigrade. The remainder of the process is similar to that described for the production of the anilido or paratoluido malonic acid esters. I believe the reaction involved is as follows:

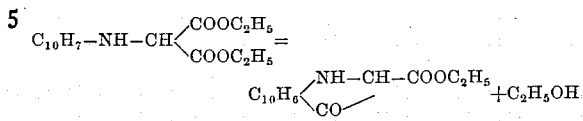

The betanaphtylindoxylic acid ester is a new chemical compound and is now produced for the first time. It is obtained in the form of a greenish-yellow powder, melting at a temperature of 158° centigrade, and possesses properties similar to those of the two indoxylic acid esters above described. By heating the betanaphtylamidomalonic acid ester with concentrated sulfuric acid the sulfonic acids of the betanaphtylindigo are formed.

The temperatures above given for the condensing reaction are to be considered as those by means of which my best results have been obtained.

Having thus described my invention, what I claim, and desire to secure by Letters Patent, is—

The within-described process of producing indoxylic compounds of aromatic amido malonic acid esters by heating the aromatic amido malonic acid esters up to temperatures of about 200° to 270° centigrade until one molecule of alcohol is eliminated.

In testimony whereof I affix my signature in presence of two witnesses.

RUBEN BLANK.

Witnesses:
CHAS. H. DAY,
HENRY HASPER.